United States Patent
Mukoyama et al.

(10) Patent No.: US 10,177,697 B2
(45) Date of Patent: Jan. 8, 2019

(54) AUTOMATIC VOLTAGE REGULATOR, AUTOMATIC VOLTAGE REGULATING METHOD, GENERATOR EXCITATION SYSTEM, AND POWER GENERATION SYSTEM

(71) Applicant: KABUSHIKI KAISHA TOSHIBA, Minato-ku (JP)

(72) Inventors: Shinji Mukoyama, Yokohama (JP); Masahiko Shibata, Hino (JP); Daisuke Hiramatsu, Oita (JP); Yoichi Uemura, Shinagawa (JP); Dai Nozaki, Yokohama (JP); Kazuhiro Suzuki, Sagamihara (JP); Daisuke Iwashita, Okayama (JP); Kuniomi Niida, Fukushima (JP); Kazuma Tsujikawa, Kawasaki (JP); Akira Okinaka, Chigasaki (JP); Yutaro Arai, Koriyama (JP); Masataka Sato, Fukushima (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/787,751

(22) Filed: Oct. 19, 2017

(65) Prior Publication Data
US 2018/0131303 A1     May 10, 2018

(30) Foreign Application Priority Data

Nov. 4, 2016    (JP) ................................. 2016-216610

(51) Int. Cl.
*H02P 9/00*         (2006.01)
*H02P 9/30*         (2006.01)

(52) U.S. Cl.
CPC .............. *H02P 9/006* (2013.01); *H02P 9/302* (2013.01)

(58) Field of Classification Search
USPC ........... 322/24, 28; 318/437; 700/45; 701/93
See application file for complete search history.

(56) References Cited

U.S. PATENT DOCUMENTS 3,619,761 A * 11/1971 Nagae ....................... H02P 9/38
                                                    322/25
3,947,762 A * 3/1976 Hug ..................... G01R 21/001
                                                    324/142

(Continued)

FOREIGN PATENT DOCUMENTS

JP              11-027995         1/1999

*Primary Examiner* — Pedro J Cuevas
(74) *Attorney, Agent, or Firm* — Oblon, McClelland, Maier & Neustadt, L.L.P.

(57) ABSTRACT

In one embodiment, an automatic voltage regulator includes a detection instruction unit configured to monitor a generator output voltage, and output an instruction signal when the output voltage of the generator 12 deviates from a predetermined range, the instruction signal being a signal of instructing detection of a specifying parameters generated in a generator field circuit of a generator excitation system; a field-parameter detection unit configured to detect the specifying parameters following to the instruction signal; and a comparison calculator configured to calculate a comparison value between the specifying parameters and a predetermined allowable upper-limit voltage-value of each component constituting the generator excitation system.

12 Claims, 6 Drawing Sheets

(56) References Cited

U.S. PATENT DOCUMENTS

| | | | | |
|---|---|---|---|---|
| 4,329,637 A * | 5/1982 | Kotake | H02P 9/10 | 322/20 |
| 4,816,699 A * | 3/1989 | Mori | H03G 11/00 | 327/165 |
| 4,992,672 A * | 2/1991 | Norton | H02J 7/1438 | 307/10.1 |
| 5,079,691 A * | 1/1992 | Heck | F02D 41/2432 | 123/480 |
| 5,083,038 A * | 1/1992 | Fukushima | H02J 7/1446 | 290/40 A |
| 5,140,253 A * | 8/1992 | Itoh | H02P 9/305 | 322/25 |
| 5,166,538 A * | 11/1992 | Norton | H02J 7/1438 | 307/10.1 |
| 5,262,711 A * | 11/1993 | Mori | H02J 7/1446 | 320/123 |
| 5,444,354 A * | 8/1995 | Takahashi | H02J 7/1438 | 320/162 |
| 5,508,601 A | 4/1996 | Good et al. | | |
| 5,532,574 A | 7/1996 | Wolfe et al. | | |
| 5,581,172 A * | 12/1996 | Iwatani | H02J 7/1446 | 322/24 |
| 5,621,633 A * | 4/1997 | Tanomura | H02M 7/145 | 363/97 |
| 5,625,276 A * | 4/1997 | Scott | B23K 9/1062 | 310/114 |
| 5,680,246 A * | 10/1997 | Takahashi | H01S 3/1301 | 359/341.43 |
| 5,992,383 A * | 11/1999 | Scholten | F02D 11/10 | 123/399 |
| 6,052,644 A * | 4/2000 | Murakami | B60K 31/0058 | 123/319 |
| 6,337,561 B1 * | 1/2002 | Sudou | H02P 9/105 | 322/19 |
| 6,724,264 B2 * | 4/2004 | Kondoh | G05B 5/01 | 331/1 A |
| 6,806,670 B2 * | 10/2004 | Kusaka | H02P 1/46 | 318/430 |
| 7,208,918 B2 * | 4/2007 | Shirakawa | B60K 6/26 | 322/24 |
| 7,271,570 B2 * | 9/2007 | O'Gorman | H02J 7/1492 | 322/22 |
| 7,342,366 B2 * | 3/2008 | Ueda | B62D 5/046 | 180/446 |
| 7,443,142 B2 * | 10/2008 | O'Gorman | H02J 7/1492 | 322/24 |
| 7,973,517 B2 * | 7/2011 | Nakajima | H02M 1/32 | 322/24 |
| 8,008,896 B2 * | 8/2011 | Nakada | H02P 9/30 | 322/28 |
| 8,421,423 B2 * | 4/2013 | Nakada | H02J 7/245 | 322/28 |
| 8,773,080 B2 * | 7/2014 | Albsmeier | H02P 9/04 | 322/24 |
| 8,803,488 B2 * | 8/2014 | Daigo | H02M 1/15 | 322/24 |
| 8,854,016 B2 * | 10/2014 | Daigo | H02M 1/15 | 322/24 |
| 9,774,233 B2 * | 9/2017 | Shimanuki | H02K 19/26 | |
| 2001/0043055 A1 * | 11/2001 | Tanaka | H02J 7/1446 | 322/28 |
| 2003/0210006 A1 * | 11/2003 | Kusaka | H02P 1/46 | 318/437 |
| 2005/0237033 A1 * | 10/2005 | Shirakawa | B60K 6/26 | 322/28 |
| 2007/0176579 A1 * | 8/2007 | O'Gorman | H02J 7/1492 | 322/28 |
| 2011/0068752 A1 * | 3/2011 | Nakada | H02J 7/245 | 322/28 |
| 2012/0153904 A1 * | 6/2012 | Albsmeier | H02P 9/04 | 322/28 |
| 2015/0115780 A1 * | 4/2015 | Shimanuki | H02K 19/26 | 310/68 D |
| 2015/0115903 A1 * | 4/2015 | Katsurada | H02P 9/04 | 322/24 |
| 2015/0137786 A1 | 5/2015 | Maddali et al. | | |
| 2017/0040402 A1 * | 2/2017 | Yasumoto | G09G 3/3648 | |
| 2017/0294864 A1 * | 10/2017 | Tada | H02P 29/50 | |
| 2017/0310197 A1 * | 10/2017 | Shimanuki | H02K 9/08 | |

* cited by examiner

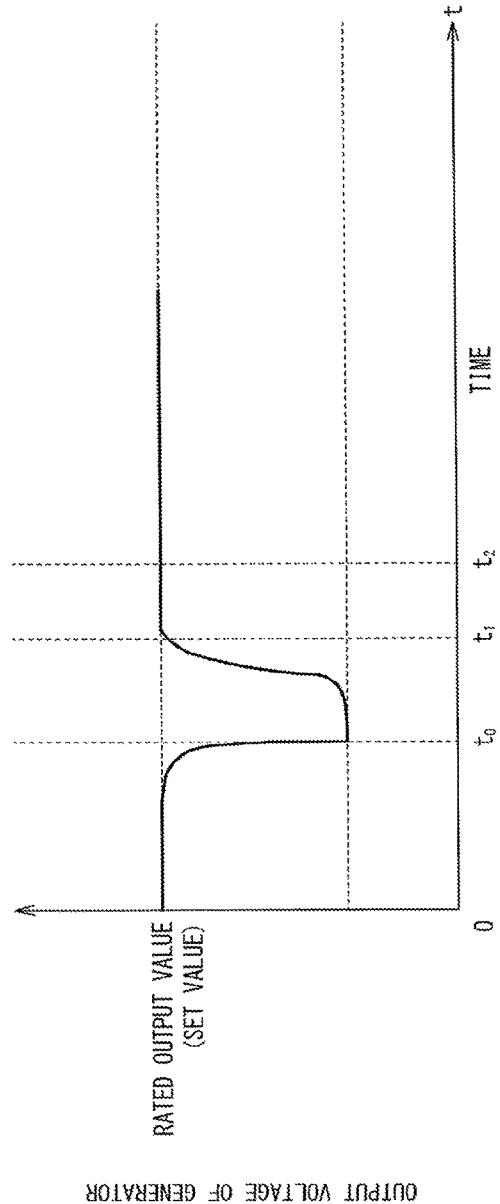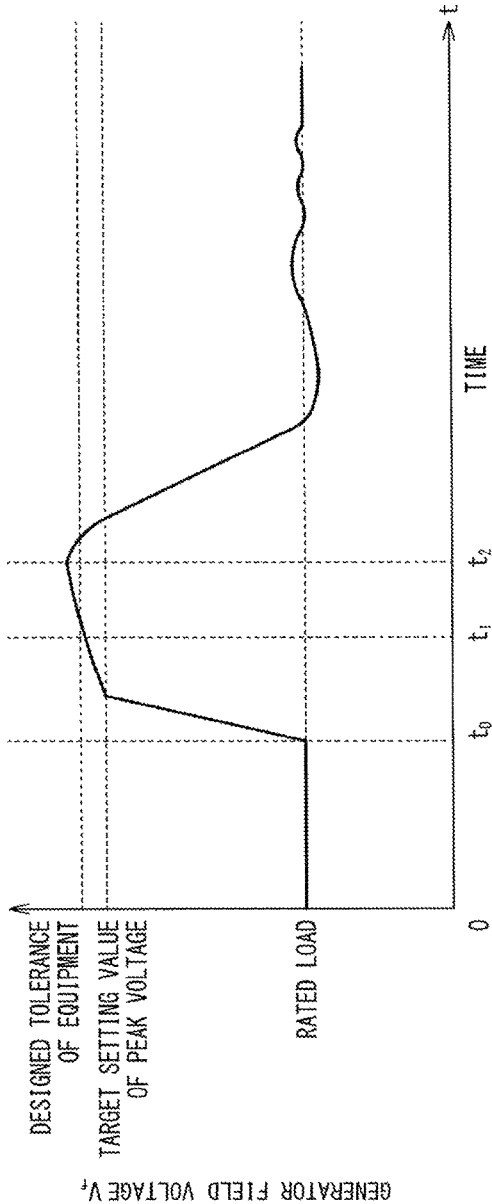
FIG. 3A
FIG. 3B

AUTOMATIC VOLTAGE REGULATOR, AUTOMATIC VOLTAGE REGULATING METHOD, GENERATOR EXCITATION SYSTEM, AND POWER GENERATION SYSTEM

CROSS-REFERENCE TO RELATED APPLICATION

This application is based on and claims the benefit of priority from Japanese Patent Application No. 2016-216610, filed on Nov. 4, 2016, the entire contents of which are incorporated herein by reference.

FIELD

Embodiments described herein relate generally to automatic voltage regulating technology to control a field formed by a generator.

BACKGROUND

In a revolving-field type synchronous generator, a direct-current is provided to a generator field circuit, which causes field coils in the generator to become an electromagnet.

The type of the method of exciting the field coils is roughly divided into a thyristor excitation system and a brushless excitation system. In the brushless excitation system, a sliding contactor such as a brush or a slip ring which electrically connects the brush is not necessary.

As the synchronous generator of the brushless excitation system doesn't require a sliding contactor, and thus the replacement of a brush and frequent maintenance are unnecessary. Hence, a synchronous generator of the brushless excitation system is actively adopted in, e.g., Europe.

The brushless excitation system includes an alternating-current. (AC) exciter configured to mainly excite a field circuit of a field coils and a permanent magnet generator (PMG) configured to excite this AC exciter.

An AC exciter armature rotates in a static magnetic field which is generated in an enclosed space of an AC exciter field coil by the PMG, and thereby an AC current is generated in the AC exciter armature.

This AC current is rectified into a direct current by a rectifier circuit provided on a rotational shaft, then the direct current flows into the generator field circuit, and thereby the generator field coil is excited.

In the brushless excitation system, it is possible to control the mount of the current in the generator field circuit and to control the excitation of the generator field coil by increasing or decreasing the current flowing from a PMG armature into the AC exciter field circuit.

In general, the amount of the power generated is kept constant by an automatic voltage regulator (AVR) which automatically regulates the output of the PMG by monitoring a generator output voltage.

When an accident occurs in an electric power system, e.g., when a generator output voltage rapidly drops due to the cloud-to-ground discharge, the AVR controls the output of the PMG and raises the output voltage of the generator in a short time by applying a field voltage which is higher than a rated field voltage of the generator (hereinafter, this operation is referred to as a positive forcing operation).

Although an output voltage of the generator is stably controlled by a conventional AVR even in the case of irregularity as described above, there has been a demand for novel technology to achieve to control the output voltage of the generator more reliably than conventional technology.

BRIEF DESCRIPTION OF THE DRAWINGS

In the accompanying drawings:

FIG. 3A is a timing chart illustrating a generator output voltage when a failure occurs;

FIG. 3B is a timing chart illustrating a generator field voltage when a failure occurs;

DETAILED DESCRIPTION

Figure 1:
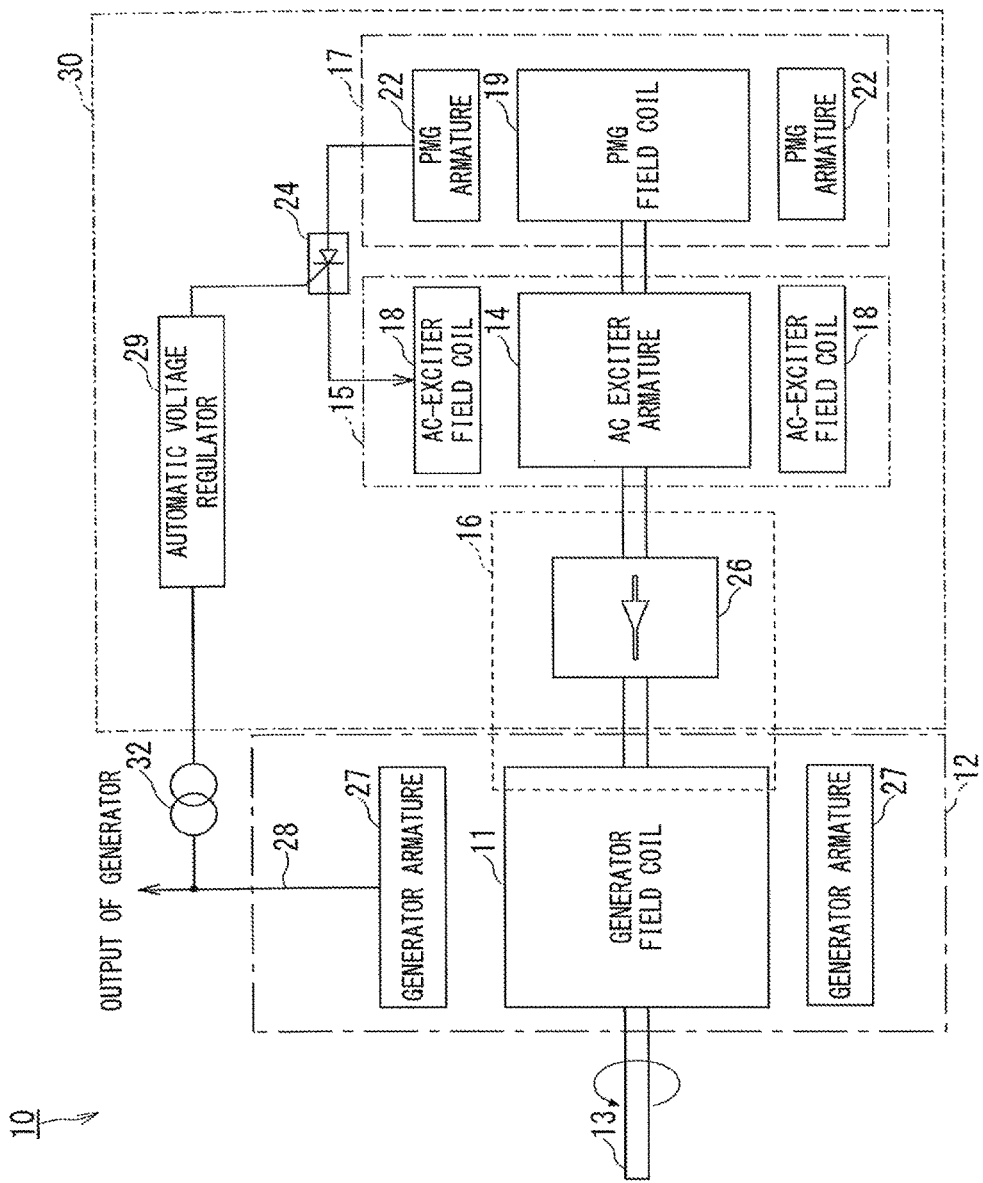
FIG. 1 is a schematic structure diagram illustrating a power generation system in which a brushless-generator excitation system is included.

Preceding to the description of embodiments, the viewpoints of the inventors of the present invention will be described below.

In the conventional technology in which the output of the generator field circuit is controlled on the basis of the output voltage of the generator 12 there is a possibility that a voltage over designed tolerance of the equipment is generated in the generator field circuit.

The situation where the voltage over designed tolerance is generated may be occurred in the case where, for example, there is a failure of a generator-voltage detection comparator, and so there is considerable difference between the actual voltage in the generator field circuit and the voltage calculated from the output voltage of the generator.

It is also the case where the change of the output voltage of the generator 12 delays from the change of the voltage value to a large extent.

In particular, in the case of a brushless excitation device, the response of the output voltage of the generator 12 tends to be delayed with respect to an instruction from an AVR due to its transmission structure.

Thus, when the field voltage is returned to the rated voltage (i.e., rated load) after an operator confirming the increase in the output voltage of the generator 12, a voltage over the designed tolerance of the equipment is generated in the generator field circuit in some cases.

When the voltage generated in the generator field circuit exceeds the designed tolerance of the equipment, there is a possibility that excessive load is imposed on a rectifier circuit connected to the generator field circuit or a fuse in this rectifier circuit.

For this reason, as to a generator excitation system, the present inventors have worked out a novel and revolutionary configuration. In this revolutionary configuration, the controlling of the output voltage of the generator 12 is achieved while a field voltage actually applied to a generator field circuit is reflected in the controlling such that the protection of respective elements in an excitation system is secured.

Hereinafter, a description will be given of the respective embodiments of an automatic voltage regulator, an automatic voltage regulating method, a generator excitation system, and a power generation system, each of which is equipped with the above-described revolutionary configuration, with reference to the accompanying drawings.

Note that the same reference signs are given for identical components in each figure, and duplicate description is omitted.

In one embodiment, an automatic voltage regulator includes a detection instruction unit configured to monitor a generator output voltage, and output an instruction signal when the output voltage of the generator 12 deviates from a predetermined range, the instruction signal being a signal of the instructing detection of a specifying parameters generated in a generator field circuit of a generator excitation system; a field-parameter detection unit configured to detect the specifying parameters following to the instruction signal; and a comparison calculator configured to calculate a comparison value between the specifying parameters and a predetermined allowable upper-limit voltage-value of each component constituting the generator excitation system.

In one embodiment, an automatic voltage regulating method includes the steps of monitoring a generator output voltage; outputting an instruction signal when the output voltage of the generator 12 deviates from a predetermined range, the instruction signal being a signal of the instructing detection of a specifying parameters generated in a generator field circuit of a generator excitation system: setting an allowable upper limit value of the specifying parameters; detecting the specifying parameters following to the instruction signal; and calculating a comparison value between the specifying parameters and a predetermined allowable upper-limit voltage-value of each component constituting the generator excitation system.

FIG. 1 is a schematic structure diagram illustrating a power generation system 10 in which a brushless excitation device is included.

In the power generation system 10 of the revolving-field type, a rotational shaft 13 is provided with a generator field coil 11, an AC exciter armature 14, and a permanent magnet field coil (PMG field coil) 19 as shown in FIG. 1.

Figure 2:
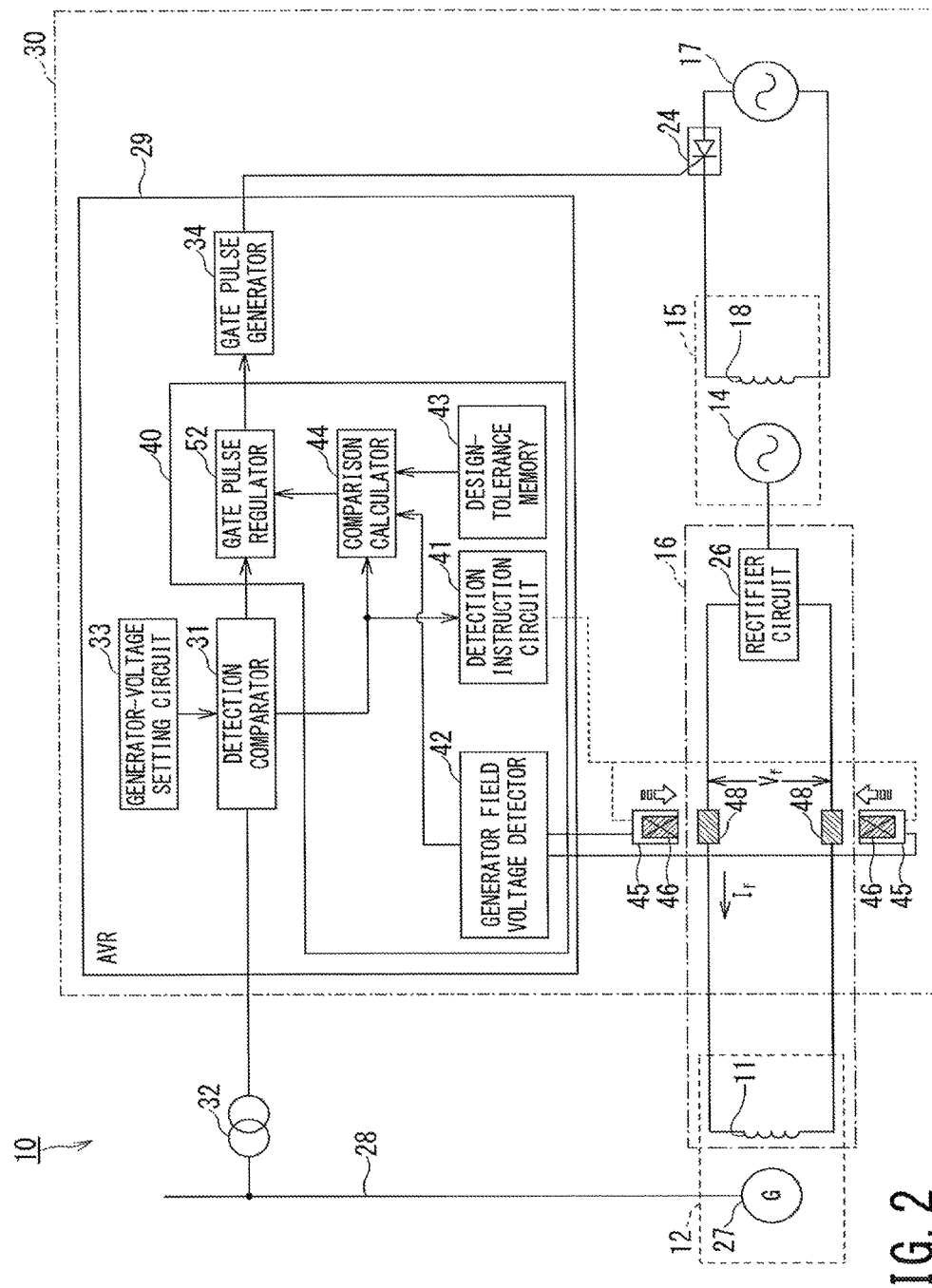
FIG. 2 is a schematic circuit-block diagram illustrating a generator excitation system which is equipped with the automatic voltage regulator of the first embodiment.

The AC exciter armature 14 and the generator field coil 11 is electrically connected to each other, and constitute a generator field circuit 16 as shown in FIG. 2.

An AC current is generated in the PMG armature 22 by the rotation of the AC exciter 15, a permanent magnet generator (PMG) 17, and the PMG field coil 19, and the AC current is converted into a direct current by the rectifier 24 so as to generate a static magnetic field in an AC-exciter field coil 18.

The AC exciter armature 14 rotates in this static magnetic field so as to generate an AC current. in the generator field circuit 16, and thereby the generator field coil 11 is excited.

Accordingly, the induced electromotive force in the generator armature 27 generated by the rotation of the generator field coil 11. is outputted as the output voltage of the generator 12 of the power generation system 10.

An automatic voltage regulator (AVR) 29 is connected to power output wiring 28 which is connected to the generator armature 27.

The AVR 29, in many cases with the brushless-type power generation system 10, stabilizes the output voltage of the generator 12 by the regulating degree of the excitation of the AC-exciter field coil 18 in accordance with the output voltage of the generator 12.

In the AVR 29 of each embodiment as described below, controllability is improved by detecting at least one specifying parameters of the generator field circuit 16 related to the generator field coil 11 in addition to the output voltage of the generator 12 of the power generation system 10.

The specifying parameters is physical quantity for specifying the state of the generator field coil 11 such as a field current $I_f$, a generator field voltage $V_f$, and field resistance.

In the following, a description will be given of a case where the generator field voltage $V_f$ of the generator field coil 11 is used for the specifying parameters.

FIRST EMBODIMENT

FIG. 2 is a schematic circuit diagram illustrating a generator excitation system 30 equipped with the AVR 29 of the first embodiment.

In the AVR 29, a generator-voltage detection comparator 31 (hereinafter, simply referred to as the detection comparator 31) monitors the output voltage of the generator armature 27 of the power generation system 10 (hereinafter, referred to as the output voltage of the generator 12) in general.

The detection comparator 31 monitors magnitude relationship between a set value being set by the generator-voltage setting circuit 33 and the output voltage of the generator 12 having been regulated by a transformer 32 to a monitorable value which can be monitored.

The setting value being set by the generator-voltage setting circuit 33 is, e.g., a rated output value of the output voltage of the generator 12.

Note that the monitoring target for the detection comparator 31 may be another parameter such as a voltage value inputted to the AC-exciter field coil 18 instead of the output voltage of the generator 12.

When the output voltage of the generator 12 is smaller than the set value being set by the generator-voltage setting circuit 33, the detection comparator 31 performs the positive forcing operation described above.

In other words, the detection comparator 31 outputs a gate-pulse modulation instruction to the gate pulse generator 34, in such a manner that the gate pulse transmitted from the gate pulse generator 34 to the rectifier 24 is modulated and a direct current flowing the AC-exciter field coil 18 of the PMG 17 is increased.

The detection comparator 31 increases the amount of the induced current flowing the generator field circuit 16 by strengthening the magnetic field of the AC-exciter field coil 18.

Additionally, the detection comparator 31 holds an allowable upper limit value of the generator field voltage $V_f$ in general.

The allowable upper limit value of the generator field voltage $V_f$ is set to a value which is, e.g., approximately 70% to 80% of the designed tolerance of each circuit element related to the generator field voltage $V_f$ such as a rectifier cell of the rectifier circuit 26.

FIG. 3A is a timing chart illustrating the output voltage of the generator 12 when a failure occurs, and FIG. 3B is a timing chart illustrating the generator field voltage $V_f$ when a failure occurs.

When the output voltage of the generator 12 rapidly drops due to the occurrence of a failure, the detection comparator 31 outputs the gate-pulse modulation instruction to the gate pulse generator 34 such that the generator field voltage $V_f$ is risen as shown in FIG. 3B.

In other words, when the output voltage of the generator 12 rapidly drops ($t=t_0$), the detection comparator 31 causes the gate pulse generator 34 to modulate the gate pulse by setting a target value of the generator field voltage $V_f$ to a higher value, e.g. twice the rated value, of this generator field voltage $V_f$.

Until the armature output voltage recovers, the detection comparator 31 generates the generator field voltage $V_f$ which is higher than the rated load. After detecting the recovery of the armature output voltage, the detection comparator 31 returns the generator field voltage $V_f$ to the level of the rated load.

In order to recover the generator output quickly, it is required to increase the output, e.g. the voltage, of the generator field coil 11.

In order to increase the output of the generator field coil 11, it is required to increase the generator field voltage $V_f$ rapidly to a set value (peak voltage or ceiling voltage) which is higher than the rated load.

When the target setting value of the peak voltage is set to a value higher than the real target value, this shortens the time required for bringing the generator field voltage $V_f$ to the real target value, and thus the output voltage of the generator 12 recovers in a short span.

Depending on an aspect of a failure, the output voltage of the generator 12 recovers without reaching its peak voltage in some cases.

However, when the target setting value of the peak voltage is close to the designed tolerance of the equipment, generator field voltage $V_f$ sometimes exceeds this designed tolerance during the positive forcing operation.

This is because the generator field voltage $V_f$ actually slightly increases due to the transmission delay of field control after the generator field voltage $V_f$ reaches the peak voltage ($t=t_1$).

Hence, when the generator field voltage $V_f$ is returned to the rated load at the timing ($t=t_1$) at which the detection comparator 31 detects that the output voltage of the generator 12 has recovered to the rated output value, the generator field voltage $V_f$ exceeds this designed tolerance in some cases.

This is because there is a long information transmission process including, e.g., the change of the magnetic field intensity of the AC exciter 15 from the timing ($t=t_1$) when it is detected that the output voltage of the generator 12 has recovered to the rated output value to the timing ($t=t_2$) when the generator field voltage $V_f$ changes.

For this reason, the AVR 29 of the first embodiment further includes an auxiliary gate-pulse regulator (e.g., processing circuitry) 40 configured to directly detect the generator field voltage $V_f$ and to use the detected generator field voltage $V_f$ for assisting the control operation performed by the AVR 29, as shown in FIG. 2.

The auxiliary gate-pulse regulator 40 includes a detection instruction circuit 41, a generator-field-voltage detector (field-parameter detection circuit) 42, and a comparison calculator 44. The detection instruction circuit 41 monitors the output voltage of the generator 12, and outputs an instruction signal of the instructing detection of the field voltage generated in the generator field circuit 16 when the output voltage of the generator 12 falls below a predetermined value.

The generator-field-voltage detector 42 detects the generator field voltage $V_f$ in accordance with the instruction signal. The comparison calculator 44 calculates a comparison value between the generator field voltage $V_f$ and the allowable upper-limit voltage-value of the each component (e.g., the generator field circuit 16) constituting the generator excitation system 30.

The detection instruction circuit 41 is connected to the detection comparator 31. The detection instruction circuit 41 directly monitors the output voltage of the generator 12 or monitors a parameter related to this generator output voltage as voltage information.

When the output voltage of the generator 12 directly detected or obtained from the voltage information falls below the predetermined value, the detection instruction circuit 41 outputs the instruction signal of instructing detection of the generator field voltage $V_f$ generated in the generator field circuit 16.

Hereinafter, a description will be given of a case where the above-described voltage information is the output voltage of the generator 12 outputted from the generator 12.

The generator excitation system 30 in which the AVR 29 is in use, has a brushless excitation device as shown in FIG. 2.

In the brushless excitation device, the generator field circuit 16 rotates and this generator field circuit 16 is unequipped with a sliding contactor such as a brush.

For this reason, when configured as the brushless excitation device, the generator excitation system 30 is provided with a driver circuit 45 which receives the instruction signal outputted by the detection instruction circuit 41 and brings the pairs of the detection terminals 46 into contact with the generator field circuit 16.

Additionally, the generator field circuit 16 is provided with an output terminal 48 which are connected to the generator field circuit 16 and output the generator field voltage $V_f$.

For instance, the pairs of the detection terminals 46 are brought into contact with the output terminals 48 configured to measure an electric potential between both ends of the generator field coil 11 as shown in FIG. 2.

The generator field voltage detector 42 detects the generator field voltage $V_f$ by using the pairs of the detection terminals 46 only when the detection instruction circuit 41 instructs the detection of the generator field voltage $V_f$.

The comparison calculator 44 calculates voltage difference between the generator field voltage $V_f$ and the allowable upper-limit voltage-value predetermined for each component held by the designed-tolerance memory 43. The information on this voltage difference is transmitted to the gate pulse regulator 52.

The gate pulse regulator 52 reduces the target setting value of the generator field voltage $V_f$ instructed by a positive forcing signal which is outputted from the gate pulse generator 34 to the AC exciter field circuit 15, on the basis of the voltage difference calculated by the comparison calculator 44.

Note that an operator may manually reduce the target setting value of the generator field voltage $V_f$ based on the result of the determination of the comparison calculator 44 instead of the above-described automatic control performed by the gate pulse regulator 52.

According to the above-described configuration, the output voltage of the generator 12 can be recovered to the rated output while the generator field voltage $V_f$ is being monitored so as not to reach an excessive voltage.

Figure 4:
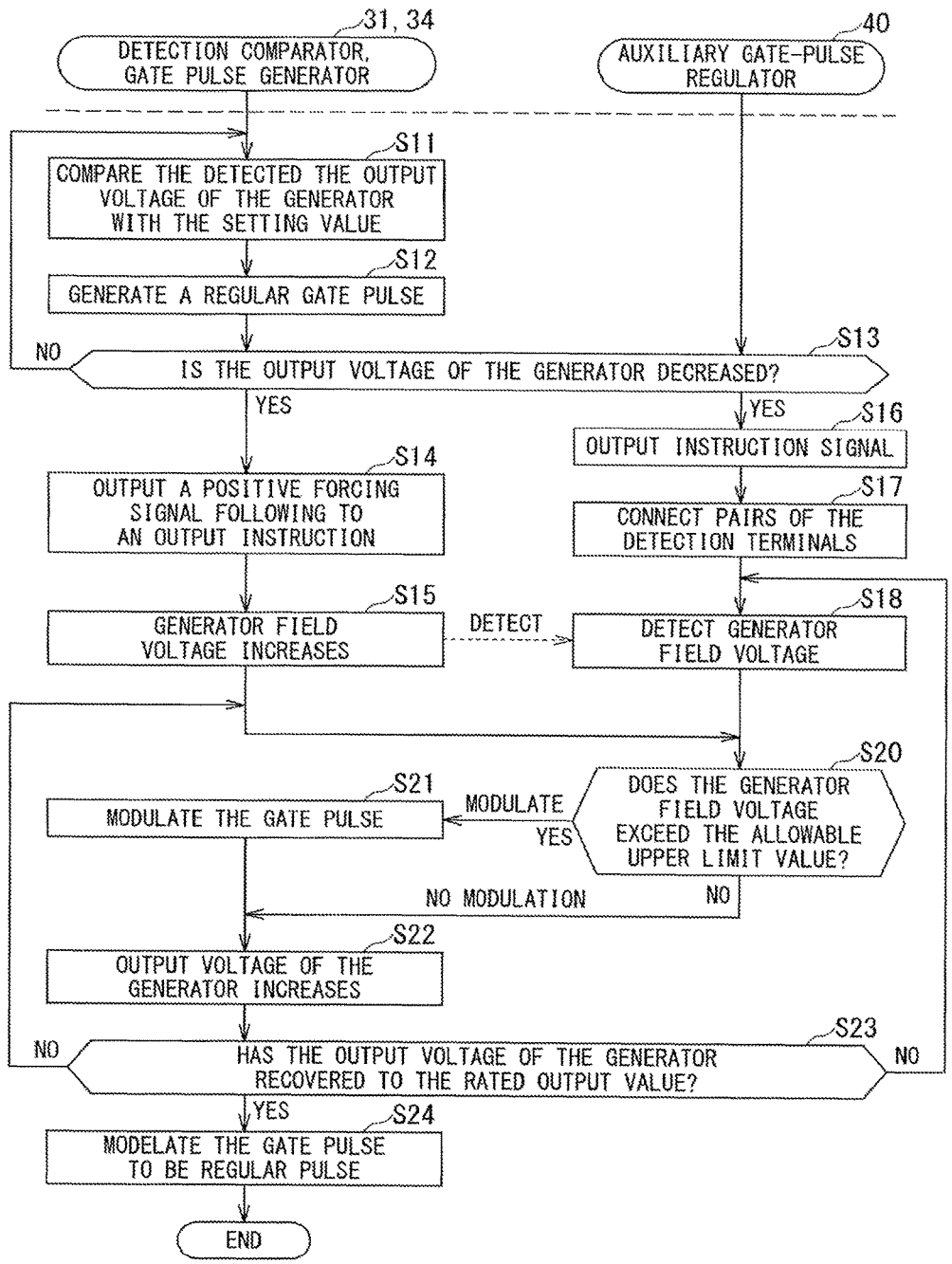
FIG. 4 is a sequence chart illustrating the automatic voltage regulating method of the first embodiment.

Next, the automatic voltage regulating method of the first embodiment will be described on the basis of the sequence chart shown in FIG. 4 by referring to FIG. 1 and FIG. 2 as required.

In other words, a description will be given of the voltage regulating method when the output voltage of the generator 12 rapidly dropped.

In the step S11, the detection comparator 31 keeps the monitoring of the output voltage of the generator 12 by detecting the output voltage of the generator 12 and comparing the detected output voltage of the generator 12 with the set value of the generator voltage.

In the step S12, the gate pulse generator 34 regularly generates a gate pulse in a normal phase while no irregularity is observed.

In the step S13, the detection comparator 31 checks whether the output, voltage of the generator 12 is rapidly decreased or not. When the output voltage of the generator 12 does not rapidly decrease (NO in the step S13), the processing returns to the step S11 in which the detection comparator 31 continues the detection and the monitoring of the output voltage of the generator 12. Conversely, when the output voltage of the generator 12 rapidly decreased (YES in the step S13), processing of the auxiliary gate-pulse regulator 40 proceeds to the step S16 and processing of the gate pulse generator 34 proceeds to the step S14.

In the step S14, the gate pulse generator 34 outputs a positive forcing signal to the rectifier 24 following to an output instruction which has been inputted by the detection comparator 31.

In the next step S15, the rectifier 24 strengthens the magnetic field output of the AC-exciter field coil 18 following to reception of the positive forcing signal. The induced electromotive force generated in the generator field circuit 16 increases due to the enhanced magnetic field output of the AC-exciter field coil 18 and thus the generator field voltage $V_f$ increases.

Meanwhile, on the side of the the auxiliary gate-pulse regulator 40, the following processing is performed after the affirmative determination in the step S13.

In the step S16, the detection instruction circuit 41 detects the rapid drop of the output voltage of the generator 12 and outputs the instruction signal.

In the next step S17, the driver circuit 45 connects the pairs of the detection terminals 46 of the generator field voltage detector 42 to the output terminals 48 of the generator field circuit 16, in synchronization with (or folloing to) the reception of the instruction signal.

In the next step S18, the generator field voltage detector 42 detects the generator field voltage $V_f$.

In the next step S20, the comparison calculator 44 checks whether the generator field voltage $V_f$ exceeds the allowable upper limit value held by the detection comparator 31 or not. When the generator field voltage $V_f$ exceeds the allowable upper limit value, the processing proceeds to the step S21 in which the gate pulse regulator 52 modulates the gate pulse to be generated by the gate pulse generator 34. Conversely, when the generator field voltage $V_f$ does not exceed the allowable upper limit value, the processing proceeds to the step S22 without going through the step S21.

In the step S22, the generator field voltage $V_f$ is maintained around the target setting value which is higher than the rated load, and thereby the output voltage of the generator 12 increases. This increase in the output voltage of the generator 12 is detected by the detection comparator 31.

In the step S23, the detection comparator 31 checks whether the output voltage of the generator 12 has recovered to the rated output value or not. When the output voltage of the generator 12 has not recovered to the rated output value, the processing returns to the step S20. When the output voltage of the generator 12 has recovered to the rated output value, the processing proceeds to the step S24. In this manner, the detection comparator 31 and the auxiliary gate-pulse regulator 40 brings the output voltage of the generator 12 back to the rated output value by repeating the process of the steps S20, S21, S22, and S23.

In the step S24 (i.e., when the output voltage of the generator 12 reaches the rated output value), the detection comparator 31 outputs the gate-pulse modulation instruction to the gate pulse generator 34 such that the generator field voltage $V_f$ is reduced to the rated load. In this manner, the output voltage of the generator 12 is maintained to the rated output value, and a series of the voltage regulating operation is completed.

The respective operation of the auxiliary gate-pulse regulator 40 and the detection comparator 31 as described above may be achieved by a computer equipped with a memory device (e.g., a Read Only Memory (ROM), a Random Access Memory (RAM), and a hard disk drive (HDD)) and a processor configured to execute predetermined programs stored in the memory.

For instance, the respective functions implemented by the detection instruction circuit 41. the generator field voltage detector 42, the comparison calculator 44, and the gate pulse regulator 52 may be achieved by causing the processes to execute the predetermined programs stored in the memory.

Instead of the software processing, the above-described functions may be achieved by hardware such as an application specific integration circuit (ASIC) and a field-programmable gate array (FPGA).

Further, the respective functions implemented by the auxiliary gate -pulse regulator 40 and the detection comparator 31 may be achieved by the combination of the software processing and hardware processing.

Moreover, out of all the components shown in FIG. 2, the threshold-value memory 43 may be configured of, e.g., a memory device such as a ROM or a RAM.

According to the AVR 29 of the first embodiment as described above, the AVR 29 can control the output voltage of the generator 12 by reflecting the generator field voltage $V_f$ which is actually applied to the generator field coil 11.

In other words, by feeding back the state of the generator field circuit 16 in a transient period to the AVR 29, it is possible to avoid generation of an excessive voltage in the generator field circuit 16 and protect each component related to the generator field circuit 16.

SECOND EMBODIMENT

Figure 5:
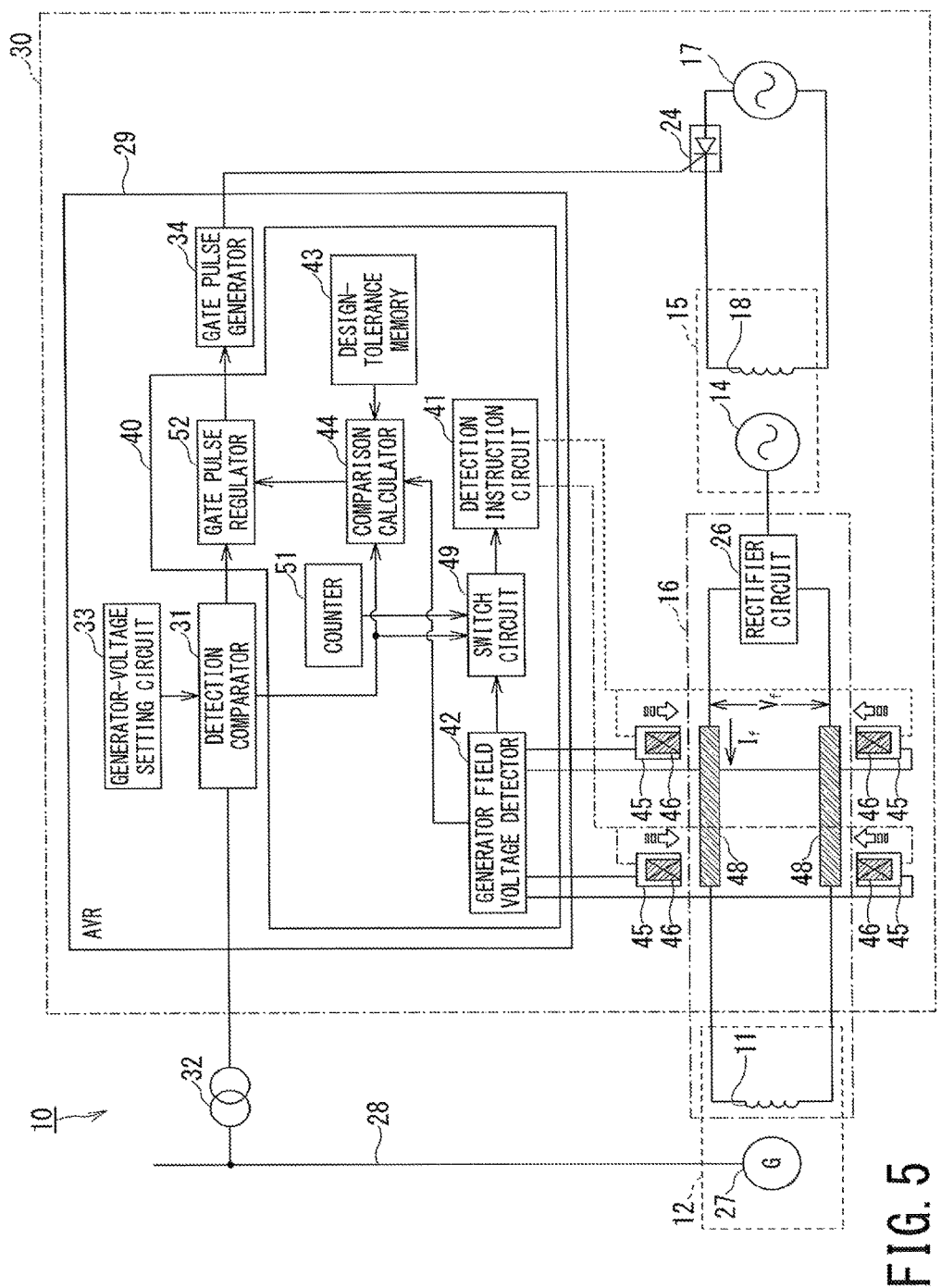
FIG. 5 is a circuit-block diagram illustrating the generator excitation system of the second embodiment.

FIG. 5 is a circuit-block diagram illustrating the generator excitation system 30 of the second embodiment.

In the generator excitation system 30 of the second embodiment, plural pairs of the pairs of the detection terminals 46 are connected in parallel with each other as shown in FIG. 5.

Further, the generator excitation system 30 includes a counter 51 and a switch circuit 49. The counter 51 counts time until the end of the product life-cycle of the pairs of the detection terminals 46 due to abrasion (i.e., galling) The switch circuit 49 switches the pairs of the detection terminals 46 used for voltage detection in accordance with an instruction inputted from the counter 51.

When the instruction signal is outputted, the pairs of the detection terminals 46 used for voltage detection are brought into contact with the generator field circuit, 16 and slide on the surface of the generator field circuit, 16 in conjunction with the rotation of generator field circuit 16. Thus, the pairs of the detection terminals 46 abrade away (i.e., gall) with the elapse of time.

In terms of continuity, it is not desirable to replace or fix the pairs of the detection terminals 46 by stopping the power generation system 10 every time the product life-cycle of the pairs of the detection terminals 46 used for voltage detection ends. The degree of abrasion can be estimated from the times of contacts of the pairs of the detection terminals 46 or a total operation period of the power generation system 10.

For this reason, in the generator excitation system 30 of the second embodiment, two or more the pairs of the detection terminals 46 are connected to the generator field voltage detector 42 in parallel and the counter 51 and the switch circuit 49 are provided.

For instance, one detection terminal 46 is used for detecting the generator field voltage $V_f$, and the rest of the pairs of the detection terminals 46 are connected as spares in parallel with the pair used for this voltage detection.

When the counter 51 provides the switch circuit 49 with information indicating the end of the product life-cycle of the pairs of the detection terminals 46 used for the voltage detection, the switch circuit 49 switches the pair to be used for this voltage detection from the pair whose product life-cycle has ended to one of the spare pairs of the pairs of the detection terminals 46.

According to the second embodiment as described above, the pairs of the detection terminals 46 whose product life-cycle has ended can be automatically replaced by the spare detection terminal 46.

The product life-cycle of each detection terminal 46 may be determined on the basis of the number of the times of contacts of the pairs of the detection terminals 46 or a total operation period of the power generation system 10.

The counter 51 and the switch circuit 49 may be included inside the AVR 29 or be provided independently of the AVR 29.

Next, a modification of the generator excitation system 30 of the second embodiment will be described with reference to FIG. 6.

Figure 6:
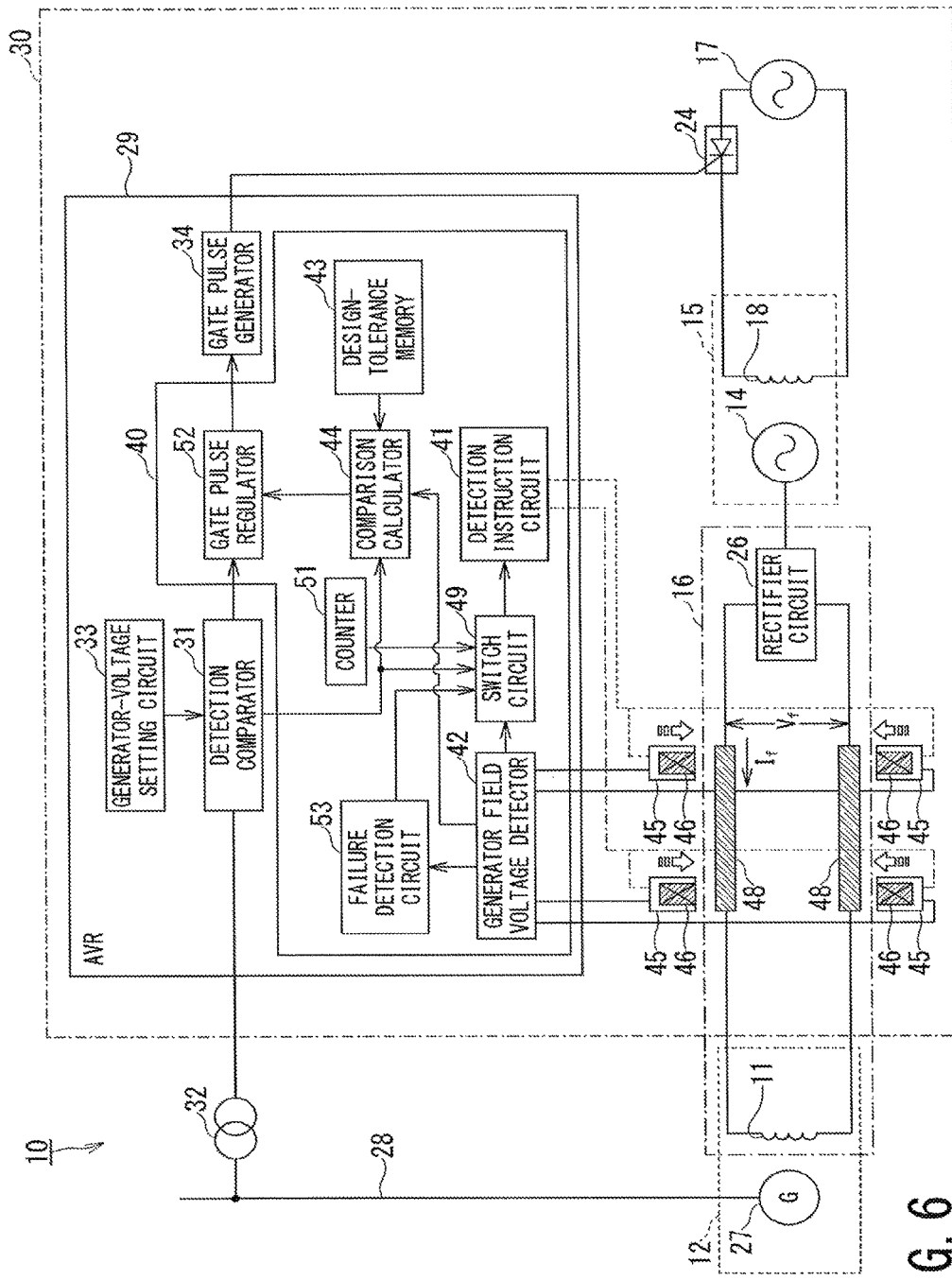
FIG. 6 is a circuit-block diagram illustrating a modification of the generator excitation system of the second embodiment.

As shown in FIG. 6, the generator excitation system 30 is provided with a failure detection circuit 53 which detects the irregularity of the pairs of the detection terminals 46 on the basis of the voltage value detected by the generator field voltage detector 42 when the pairs of the detection terminals 46 are brought into contact with the generator field circuit 16.

Even when the pairs of the detection terminals 46 in use are before the end of the product life-cycle in terms of the number of the times of the contacts or the operation period, the pairs of the detection terminals 46 in use cannot sufficiently transmit a voltage to the generator field voltage detector 42 due to, e.g., breakage in some cases.

For this reason, when the generator field voltage $V_f$ is known, the failure detection circuit 53 checks whether the target detection terminal 46 can accurately detect the generator field voltage $V_f$ or not, by bringing the target detection terminal 46 into contact with the generator field circuit 16.

The failure detection circuit 53 is connected to the generator field voltage detector 42 and the switch circuit 49.

The failure detection circuit 53 outputs an interrupt signal to the switch circuit 49, when the actual generator field voltage $V_f$ detected by the generator field voltage detector 42 is not equal to the known generator field voltage $V_f$.

As soon as the switch circuit 49 receives the interrupt signal from the failure detection circuit 53, the switch circuit 49 switches the pairs of the detection terminals 46 to be used for the voltage detection from the currently used pair to one of the spare pairs even when the time counted by counter 51 does not indicate the end of the product life-cycle of the currently used pair.

In this manner, even when the pairs of the detection terminals 46 in use are before the end of the product life-cycle, the pairs of the detection terminals 46 in use can be appropriately replaced by normal detection terminal 46 in the case of a trouble of the pairs of the detection terminals 46 in use.

The second embodiment is similar to the first embodiment in terms of configuration and operation except that (a) plural pairs of the pairs of the detection terminals 46 are connected in parallel with each other, (b) the pairs of the detection terminals 46 used for the detection are automatically switched, and (c) a failure of the pairs of the detection terminals 46 is automatically detected. Thus, duplicate description is omitted.

According to the generator excitation system 30 of the second embodiment as described above, the same effects as the first embodiment can be obtained. Further, in the second embodiment, since the pairs of the detection terminals 46 used for the detection can be automatically replace by the spares, continuity of the power generation system 10 is improved and burden of maintenance management can be reduced.

Moreover, in the second embodiment, even when the pairs of the detection terminals 46 in use are before the end of the product life-cycle, the pairs of the detection terminals 46 in use can be appropriately replaced by normal detection terminal 46 connected as spares in the case of a trouble of those detection terminals 46.

According to the automatic voltage regulator 29, the automatic voltage regulating method, or the generator excitation system 30 of at least one of the above-described embodiments, the AVR 29 is assisted in the controlling of the output voltage of the generator 12 by monitoring the generator field voltage $V_f$, and thus the output voltage of the generator 12 can be controlled reflecting the generator field voltage $V_f$ which is actually applied in the generator field coil 11.

Incidentally, the detection instruction circuit 41 is an example of the detection instruction unit described in the claims.

The generator-field-voltage detector 42 is an example of the field-parameter detection unit described in the claims.

The comparison calculator 44 is an example of the comparison calculation unit described in the claims.

Note that the above-described correspondences between terms used in the claims and terms used in the embodiments are just some of possible interpretations for reference and should not be construed as limiting the present disclosure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Although a description has been given of a case where the generator excitation system 30 equipped with the AVR 29 is configured as the brushless excitation device, a thyristor excitation device can also be controlled in a manner similar to the first and second embodiments, for instance.

What is claimed is:

1. An automatic voltage regulator comprising:
   a detection instruction unit configured to monitor a generator output voltage, and
output an instruction signal when the output voltage of the generator deviates from a predetermined range, the instruction signal being a signal of an instructing detection of a specifying parameters generated in a generator field circuit of a generator excitation system;
a field-parameter detection unit configured to detect the specifying parameters following to the instruction signal; and
a comparison calculator configured to calculate a comparison value between the specifying parameters and a predetermined allowable upper-limit voltage-value of each component constituting the generator excitation system.

2. The automatic voltage regulator according to claim 1, further comprising a gate pulse regulating unit configured to regulate a gate pulse to be inputted to a sub-excitation field coil based on the comparison value in such a manner that a field voltage outputted to the generator field circuit does not exceed an allowable value of the field voltage.

3. The automatic voltage regulator according to claim 1, further comprising a generator-voltage detection comparison unit configured to
monitor the output voltage of the generator, and
inform the detection instruction unit of occurrence of an irregular state when the output voltage of the generator deviates from the predetermined range, the irregulars state indicating that the output voltage of the generator has deviated from the predetermined range.

4. The automatic voltage regulator according to claim 1, further comprising:
a generator field circuit configured to excite a generator field coil;
an output terminal configured to be connected with the generator field circuit and output the specifying parameters; and
a driver unit configured to operate by receiving the instruction signal and bring at least one pair of detection terminals of the field-parameter detection unit into contact with the output terminal,
wherein an excitation device of the generator excitation system is a brushless excitation device.

5. The automatic voltage regulator according to claim 1, wherein an excitation device of the generator excitation system is a thyristor excitation device.

6. The automatic voltage regulator according to claim 4, wherein the at least one pair of detection terminals comprises two or more pairs of detection terminals connected in parallel with each other.

7. The automatic voltage regulator according to claim 6, further comprising:
a counter configured to count time till an end of a product life-cycle of a pair of detection terminals; and
a switching unit configured to switch a pair of detection terminals used for detecting the specifying parameters from a pair of detection terminals to another spare pair of detection terminals, in accordance with time counted by the counter.

8. The automatic voltage regulator according to claim 4, further comprising a failure detection unit configured to detect irregularity of at least one pair of detection terminals based on a voltage value detected by the field-parameter detection unit when the at least one pair of detection terminals are brought into contact with the generator field circuit.

9. A generator excitation system comprising the automatic voltage regulator according to claim 1.

10. A power generation system comprising the automatic voltage regulator according to claim 1.

11. An automatic voltage regulating method comprising:
monitoring a generator output voltage;
outputting an instruction signal when the output voltage of the generator deviates from a predetermined range, the instruction signal being a signal of instructing detection of a specifying parameters generated in a generator field circuit of a generator excitation system;
setting an allowable upper limit value of the specifying parameters;
detecting the specifying parameters following to the instruction signal; and
calculating a comparison value between the specifying parameters and a predetermined allowable upper-limit voltage-value of each component constituting the generator excitation system.

12. An automatic voltage regulator comprising:
memory circuitry configured to store a predetermined program; and
processing circuitry configured, by executing the program, to
monitor a generator output voltage,
output an instruction signal when the output voltage of the generator deviates from a predetermined range, the instruction signal being a signal of instructing detection of a specifying parameters generated in a generator field circuit of a generator excitation system;
set an allowable upper limit value of the specifying parameters;
detect the specifying parameters following to the instruction signal; and
calculate a comparison value between the specifying parameters and a predetermined allowable upper-limit voltage-value of each component constituting the generator excitation system.

* * * * *